US010789761B2

(12) United States Patent
Dong

(10) Patent No.: US 10,789,761 B2
(45) Date of Patent: Sep. 29, 2020

(54) METHOD AND DEVICE FOR PROCESSING SPATIAL DATA

(75) Inventor: Futian Dong, Jiangsu (CN)

(73) Assignee: SUZHOU SUPERENGINE GRAPHICS SOFTWARE CO., LTD., Jiangsu (CN)

(*) Notice: Subject to any disclaimer, the term of this patent is extended or adjusted under 35 U.S.C. 154(b) by 347 days.

(21) Appl. No.: 13/520,659

(22) PCT Filed: Dec. 31, 2010

(86) PCT No.: PCT/CN2010/080582
§ 371 (c)(1),
(2), (4) Date: Jul. 5, 2012

(87) PCT Pub. No.: WO2011/082650
PCT Pub. Date: Jul. 14, 2011

(65) Prior Publication Data
US 2012/0268464 A1    Oct. 25, 2012

(30) Foreign Application Priority Data

Jan. 7, 2010   (CN) .......................... 2010 1 0017268
Mar. 21, 2010  (CN) .......................... 2010 1 0144123

(51) Int. Cl.
G06T 15/20         (2011.01)
(52) U.S. Cl.
CPC ................................... *G06T 15/20* (2013.01)
(58) Field of Classification Search
None
See application file for complete search history.

(56) References Cited

U.S. PATENT DOCUMENTS 4,609,917 A * 9/1986 Shen ..................... G06T 15/405
                                              345/421
4,625,289 A * 11/1986 Rockwood ............ G06T 15/405
                                              345/422

(Continued)

FOREIGN PATENT DOCUMENTS

CN      1779685 A       5/2006
CN      1783143 A       6/2006

(Continued)

OTHER PUBLICATIONS

Catmull E. "A hidden-surface algorithm with anti-aliasing", Proc. SIGGRAPH '78, pp. 6-11, 1978. (Year: 1978).*

(Continued)

Primary Examiner — Patrick F Valdez
(74) Attorney, Agent, or Firm — Cantor Colburn LLP

(57) ABSTRACT

A method and a device for processing spatial data are disclosed, the method includes: transforming the received primitive coordinate of the primitive spatial data into view coordinates of the view window according to the preset view control parameter (S11); analyzing or processing the view coordinates in the view window according to the preset processing method corresponding to the processing type (S12); analyzing or processing the primitive spatial data according to the analyzing or processing result of the view coordinates (S13). The method for processing spatial data disclosed by the embodiment transforms the primitive coordinates of primitive spatial data into the view coordinates of the view window, which solves the problem that the amount of processing result of the spatial data is too huge, and makes it sure that all the processed spatial data can display the spatial relationship among the spatial data correctly.

19 Claims, 6 Drawing Sheets

(56) References Cited

U.S. PATENT DOCUMENTS

| | | | | |
|---|---|---|---|---|
| 5,701,444 | A | * | 12/1997 | Baldwin .................. G06T 1/20 345/506 |
| 5,988,862 | A | * | 11/1999 | Kacyra ................ G01B 11/002 382/195 |
| 6,246,468 | B1 | * | 6/2001 | Dimsdale ............. G01B 11/002 356/4.02 |
| 6,741,242 | B1 | | 5/2004 | Itoh et al. |
| 7,804,498 | B1 | * | 9/2010 | Graham et al. ............... 345/419 |
| 7,814,436 | B2 | * | 10/2010 | Schrag et al. ................. 715/851 |
| 7,831,087 | B2 | * | 11/2010 | Harville ........................ 382/154 |
| 7,995,054 | B2 | * | 8/2011 | Wheeler et al. .............. 345/419 |
| 2004/0189645 | A1 | * | 9/2004 | Beda ......................... G06F 8/38 345/473 |
| 2005/0243085 | A1 | * | 11/2005 | Schechter et al. ............ 345/419 |
| 2008/0043035 | A1 | | 2/2008 | Chang et al. |
| 2010/0085357 | A1 | * | 4/2010 | Sullivan .................. G06T 15/06 345/420 |
| 2011/0115783 | A1 | * | 5/2011 | Janson .......................... 345/419 |

FOREIGN PATENT DOCUMENTS

| | | |
|---|---|---|
| CN | 101127031 A | 2/2008 |
| CN | 101383053 A | 3/2009 |
| CN | 101814197 A | 8/2010 |
| JP | 8-69544 A | 3/1996 |
| JP | 2000-339443 A | 12/2000 |
| JP | 2001273520 A | 10/2001 |
| JP | 2004-271901 A | 9/2004 |
| JP | 2005241332 A | 9/2005 |
| JP | 2008078908 A | 4/2008 |
| JP | 2009-217000 A | 9/2009 |

OTHER PUBLICATIONS

International Search Report for International application No. PCT/CN2010/080582 dated Apr. 7, 2011 with English Translation.

Japanese 1st Office Action corresponding to Application No. 2014-119615; dated Apr. 21, 2015, with English translation.

D. Cohen-Or et al., "Visibility Streaming for Network-based Walk-throughs," Proc. Graphics Interface, 1998, XP055371267, Retrieved from the Internet: URL:http: courses.cs.tau.ac.il/~dcor/graduate_students/EZHomepage/files/Visibility Streaming and Occlusion Culling for Client Server SysternsGI98.pdf [retrieved on May 1, 2017] the whole document; 7 pages.

Extended European Search Report corresponding to Application No. 10841993.8-1502/2523121 PCT/CN2010080582; dated May 31, 2017.

R. Stuart Ferguson, "Chapter 4: Fast Realistic Rendering (part)" in "Practical Aigorithms for 3D Computer Graphics;" Jan. 1, 2001, AK Peters, XP0055371239, ISBN; 978-1-56881-154-3, pp. 87-117.

* cited by examiner

METHOD AND DEVICE FOR PROCESSING SPATIAL DATA

CROSS REFERENCE TO RELATED APPLICATIONS

This is a U.S. national stage of application No. PCT/CN2010/080582, filed on 31 Dec. 2010. Priority under 35 U.S.C. § 119(a) and 35 U.S.C. § 365(b) is claimed from Chinese Application No.201010017268.8, filed 7 Jan. 2010, and Chinese Application No. 201010144123.4, filed 21 Mar. 2010, the disclosure of which are also incorporated herein by references.

FIELD OF THE INVENTION

The present invention relates to the fields of spatial information technology, computer graphics and computer operating system, and in particular to a method and device for processing spatial data.

BACKGROUND OF THE INVENTION

A spatial entity is abstraction for an entity or phenomenon that exists or is virtualized in the natural world, correlates with a spatial position or feature, and is the minimum unit that can not be divided in the natural world. There are four types of basic spatial entities, i.e., point, line, surface and space. Spatial data is used for representing the spatial position, form information and spatial relation of the spatial entity itself, such as the information of the topology relation. The spatial data structure of the spatial data includes a vector data structure and a raster data structure. The vector data structure describes a spatial entity by a spatial discrete point coordinate, and views the entire studied space as a spatial domain, and the spatial entity is distributed in this spatial domain as an independent object.

The raster data structure divides the space into uniform grids to describe a spatial entity with the characteristic of continuous distribution in a specific space.

The view representation of the spatial entity is mainly implemented by an electronic map, and the electronic map is a visual map that displays the spatial entity on an electronic screen by a specific hardware and software, which is the process of rasterizing display of the spatial entity on the electronic screen (view window). Attribute and graphic information displayed on the electronic map, which is called element, is given to an element. A point entity corresponds to point elements, a line entity corresponds to line elements, and a surface entity corresponds to surface elements. In the graphic information of the spatial entity, the graphic information of the point element often includes a symbol type, a symbol size and a symbol color of the point; the graphic information of the line element includes the type of the linear symbol, the width of the linear symbol and the color of the linear symbol; and the graphic information of the surface element includes a filling type (transparent or opaque) of the surface, a symbol type of the surface and a filling color of the surface. Some spatial entities record separately its corresponding graphic information, and some spatial entities provide uniform graphic information for the same type of spatial entities according to the layer when the electronic map is displayed.

A view is an interface for selecting a spatial entity to be displayed in the view window according to a given spatial condition. The prior process of displaying the spatial entity by the view is the process of rasterizing the spatial entity: firstly, extracting the spatial entity consistent with the given spatial condition according to a spatial data index, transmitting the extracted spatial entity to a user that uses the spatial entity, i.e., a client, via a transmission medium, then performing a series of geometric transformation and processes on the spatial data of the spatial entity, drawing a two-dimensional raster image, and outputting or displaying the image on a screen, for example, displaying on a computer screen, printing and outputting on a paper, and generating an image file to be output.

The above rasterizing is to transform the spatial data of the graphic represented in the vector graphic format into a raster image, and each of the pixel values of the raster image often represents the value of the color, which is used in the processes, such as displaying on the display, printing and outputting on a paper and generating an image file to be output.

Geographic Information System (GIS) platform software and Virtual Reality (VR) platform software are the main platform software for processing spatial entity. The most frequent operation of such platform software is the amplification, reduction and movement of the electronic map or three-dimensional scene roaming, which is based on the displaying of the spatial entity. In addition, for some complicate spatial relations, every time the calculation of the spatial relation is performed, such as the calculation of the collision detection and avoidance on element annotation, the spatial data needs to be read and transmitted multiple times.

With rapid development and extensive application of GIS and VIR techniques, the spatial data increases explosively. Especially, with the networking of the spatial technique and the popularizing of network GIS and VR techniques application, selecting, transmitting, displaying and analyzing of the massive spatial data have become the main technical bottleneck that restricts the development of an industry, such as GIS and VR.

SUMMARY OF THE INVENTION

In view of this, the present invention provides a method and device for processing spatial data, and the specific solutions are as follows.

A method for processing spatial data, including:

transforming an original coordinate of a received original spatial data into a view coordinate in a view window according to a preset view control parameter;

analyzing or processing the view coordinate in the view window according to a processing method corresponding to a set processing type; and analyzing or processing the original spatial data according to the result of analyzing or processing of the view coordinate.

Preferably, the view window is represented by a data structure according to the view control parameter.

Preferably, the step of representing the view window using a data structure according to the view control parameter includes:

representing a pixel of the view window by a raster data structure according to the view control parameter, the pixel being a uniform grid unit into which the plane of the view window is divided, the pixel being a basic information storage unit in the raster data, and a coordinate position of the pixel being determined according to a corresponding line number and column number of the pixel in the view window.

Preferably, the step of analyzing or processing the view coordinate in the view window according to a processing method corresponding to a set processing type includes:

analyzing or processing a pixel to be operated when the original spatial data is displayed in the view window, according to a processing method corresponding to a set processing type; and analyzing or processing the view coordinate according to the result of analyzing or processing the pixel.

Preferably, the step of analyzing or processing the view coordinate in the view window according to a processing method corresponding to a set processing type includes:

analyzing or processing a pixel corresponding to a view coordinate point in the view window according to a processing method corresponding to a set processing type; and analyzing or processing the view coordinate point according to the result of analyzing or processing the pixel.

Preferably, the step of analyzing or processing the view coordinate in the view window according to a processing method corresponding to a set processing type includes:

rasterizing a pixel to be operated when the original spatial data is displayed in the view window by the view coordinate, by means of assigning a value to the pixel, according to a processing method corresponding to a set processing type;

analyzing or processing the pixel in the view window; and analyzing or processing the view coordinate according to the result of analyzing or processing the pixel.

Preferably, the step of analyzing or processing the view coordinate in the view window according to a processing method corresponding to a set processing type includes:

analyzing or processing the view coordinate directly according to a processing method corresponding to a set processing type.

Preferably, the step of analyzing or processing a pixel to be operated when the original spatial data is displayed in the view window includes:

reading the value of the pixel to be operated, which includes reading the value of the data for representing the pixel to be operated;

judging whether the value of the pixel to be operated conforms to a preset condition; and assigning a value to the pixel to be operated, which includes assigning a value to the data for representing the pixel to be operated.

Preferably, the method further includes: sending the original spatial data that has been analyzed or processed.

Preferably, the view control parameter includes a view mode and a parameter of a bounding rectangle of the view window, the view mode includes a two-dimensional mode and a three-dimensional mode, and the parameter of the bounding rectangle of the view window includes the width and height of the bounding rectangle of the view window.

Preferably, in the case that the view mode is the two-dimensional mode, the view control parameter further includes the center coordinate point of the spatial entity in the view window and an amplification ratio of the spatial entity in the view, the amplification ratio of the spatial entity in the view is used for representing the size in which the spatial entity is displayed in the view window.

Preferably, in the case that the view mode is the two-dimensional mode, the view control parameter further includes a rectangular range of a queried spatial entity and an amplification ratio of the spatial entity in the view.

Preferably, the step of transforming an original coordinate of a received original spatial data into a view coordinate according to a preset view control parameter includes:

selecting the spatial data within the rectangular range of the queried spatial entity; and transforming the original coordinate of the original spatial data into the view coordinate in the view window according to the parameter of the bounding rectangle of the view window, the rectangular range of the queried spatial entity and the amplification ratio of the spatial entity in the view.

Preferably, in the case that the view mode is the three-dimensional mode, the view control parameter further includes a viewpoint parameter and a projection parameter, the viewpoint parameter includes a position of the viewpoint in the world coordinate system, a position of an object viewed from the viewpoint and a upward vector of a virtual camera; and the projection parameter includes an orthogonal projection and a perspective projection.

Preferably, the step of transforming an original coordinate of a received original spatial data into a view coordinate in a view window according to a preset view control parameter includes:

transforming the original coordinate of the original spatial data into a world coordinate according to the viewpoint parameter;

transforming the world coordinate into a three-dimensional coordinate in a three-dimensional coordinate system which takes the virtual camera as a center, by means of a viewpoint transformation;

transforming the three-dimensional coordinate into a normalized two-dimensional coordinate by means of a projection transformation; and mapping the normalized two-dimensional coordinate onto a view coordinate in the view window by means of a viewport transformation.

Preferably, the set processing type includes any one or a combination of processes selected from a group consisting of selecting spatial data, simplifying, progressive transmitting and detecting and avoiding a collision on element annotation.

Preferably, the data structure is a data array; and the step of representing a pixel of the view window using a raster data structure according to the view control parameter includes:

representing a pixel array of raster data corresponding to the view window according to the data array, wherein each unit in the data array represents one pixel in the pixel array.

A device for processing a spatial data, including:

a coordinate transforming unit for transforming an original coordinate of a received original spatial data into a view coordinate in a view window according to a preset view control parameter;

a view coordinate processing unit for analyzing or processing the view coordinate in the view window according to a processing method corresponding to a set processing type; and an original spatial data processing unit for analyzing or processing the original spatial data according to the result of analyzing or processing the view coordinate.

Preferably, the system further includes a view window representing unit for representing the view window by a data structure according to the view control parameter.

Preferably, the view coordinate processing unit includes any one or a combination of units selected from a group consisting of a spatial data selecting unit, a simplifying unit, a transmitting unit and a unit of detecting and avoiding a collision on element annotation.

Preferably, the view coordinate processing unit further includes a pixel operating unit for analyzing or processing a pixel to be operated when an original coordinate point is displayed in the view window, according to a processing method corresponding to a set processing type.

Preferably, the pixel operating unit includes a pixel reading unit for reading the value of the data representing the pixel;

a pixel judging unit for judging whether the pixel value conforms to a preset condition; and a pixel assigning unit for assigning a value to the data representing the pixel.

It can be seen from the technical solutions described above that according to the method for processing spatial data disclosed by the embodiment of the present invention, the original coordinate of the original spatial data is transformed into the view coordinate in the view window, so as to be analyzed and processed, i.e., the spatial data is analyzed and processed in the view. In this way, the analyzing and processing of the problems, such as simplifying, transmitting and displaying the spatial data, only relates to the corresponding resolution of the view window, rather than the size of the original spatial data, and it is ensured that all the simplified spatial data can indicate the spatial relation between the spatial data correctly.

BRIEF DESCRIPTION OF THE DRAWINGS

In order to illustrate the technical solutions in the embodiment of the present invention or in the prior art more clearly, drawings to be used in the description of the prior art or the embodiment will be described briefly hereinafter. Apparently, the drawings described hereinafter are only some embodiments of the present invention, and other drawings can be obtained by those skilled in the art according to those drawings without creative work.

DETAILED DESCRIPTION OF THE INVENTION

Figure 1:
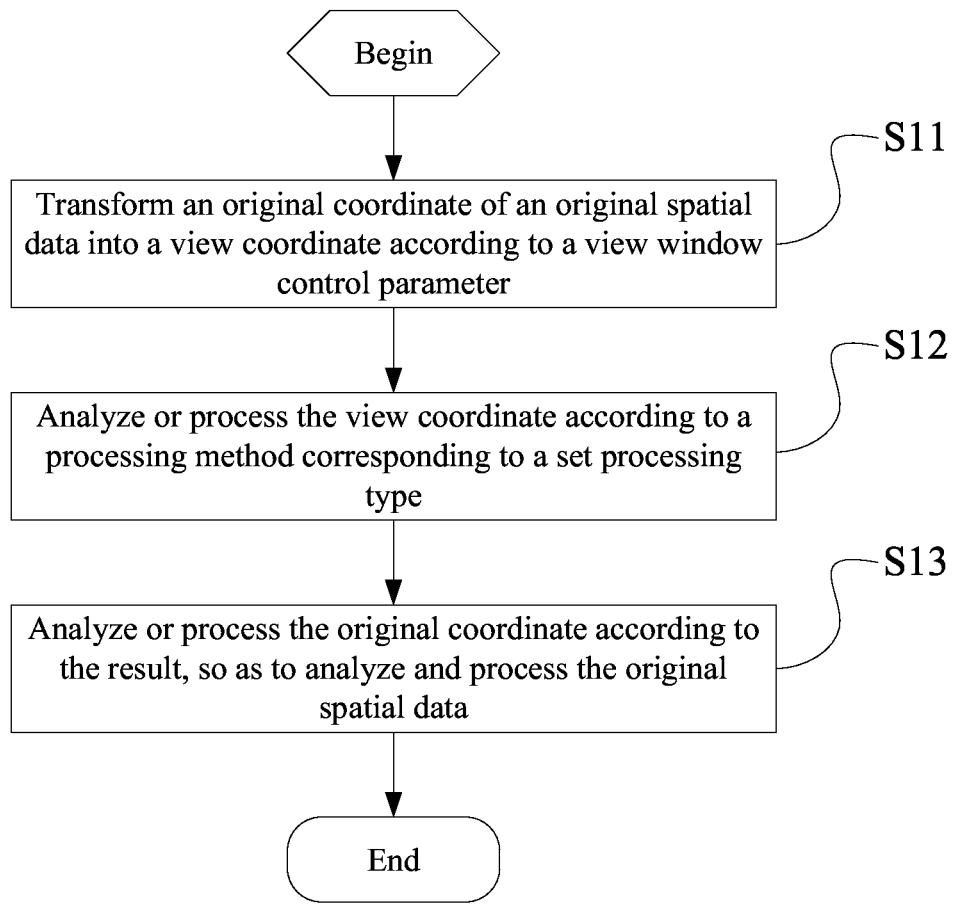
FIG. 1 is a flow chart of a method for processing spatial data disclosed by an embodiment of the present invention.

The technical solution in the embodiment of the present invention will be described clearly and completely hereinafter in conjunction with the drawings in the embodiment of the present invention. Obviously, the described embodiments are only some of the embodiments of the present invention, but not all the embodiments. All the other embodiments obtained by those skilled in the art without creative work, based on the embodiment in the present invention, fall within the scope of protection of the present invention.

After studying the problems in the view, such as selecting, transmitting, displaying and analyzing of the spatial data, those skilled in the art discover that the maximum amount of the data required for displaying and spatial data analyzing related to displaying, such as calculation of confusion detection and avoidance on element annotation, is constant, in the case that the solution of the view window is determined, no matter how much the volume of the spatial data is. Because the solution of the view window is limited, the pixel to be seen is determined, no matter how much the volume of the spatial data is. In consideration of view display, in the case that the spatial entity drawn previously is covered completely by the spatial entity drawn later in the view window, it is meaningless that the spatial entity drawn previously is read from the data server, transmitted to a client so as to display. Therefore, in the view, in the case that the solution of the view window is determined, the maximum effective spatial data required for displaying in the view window, i.e., the spatial data required for operating all the pixels in the view window, is constant, which is independent of the volume and accuracy of the spatial data.

For convenient description, in this application, the spatial data to be processed is referred to the original spatial data, the coordinate of the spatial data to be processed is referred to the original coordinate of the original spatial data, and the coordinate point of the spatial data to be processed is referred to the original coordinate point of the original spatial data, or referred to the original coordinate point directly.

In the method for processing spatial data disclosed by the present invention, based on the above point for the view, the original coordinate of the original spatial data is transformed into the view coordinate in the view window, the view coordinate is analyzed or processed in the view window, and according to the result of analyzing or processing, the original spatial data corresponding to the view coordinate is analyzed or processed. The view window is represented using the data structure according to the view control parameter, and the data structure can be a raster data structure or a vector data structure. Because of the prior display device is mostly a raster device, in the embodiment of this application, the related description is given by mostly taking the raster data structure as an example. The specific implementations are described as follows.

The flow chart of a method for processing spatial data disclosed by the present invention is shown in FIG. 1, and the method includes the following steps.

Step S11: transforming an original coordinate of received original spatial data into a view coordinate in a view window according to a preset view control parameter.

The view control parameter in this embodiment includes a view mode and a parameter of the bounding rectangle of the view window. The view mode is a two-dimensional mode or a three-dimensional mode, which is preset according to the actual view window. The parameter of the bounding rectangle of the view window is the range of the view window for displaying the spatial entity (0, 0, ViewWidth, ViewHeight), such as the range of the window for displaying map on the computer screen. The parameter of the bounding rectangle of the view window includes the width ViewWidth of the bounding rectangle of the view window and the height ViewHeight of the bounding rectangle of the view window, by which the size of the window for displaying image in the actual view window can be determined.

After the view control parameter is determined, the view window is represented using the data structure according to the view control parameter. The view window to be represented here can be a physical view window that can be used for displaying actually, and can also be a logical view window circumstance that is generated for analyzing.

When the view window is represented using the raster data structure, the raster data is used to represent the two-dimensional raster image, the plane of the window for displaying the view is divided into uniform grids, each of the grid units is referred to a pixel, the raster data structure is a pixel array, each pixel in the raster is a basic information storage unit for storing the raster data, and the coordinate position of the pixel can be determined by a line number and a column number. Because the raster data is arranged according to a specific rule, the represented position relation of spatial entities is implied in the line number and the column number. Each pixel value is used to represent an attribute or attribute code of the spatial entity.

The size of the raster data for representing the view window can be obtained by the parameter of the bounding rectangle of the view window in the view control parameter. For example, if one pixel value is represented in m bytes, the size of the raster data for representing the view window is (ViewWidth*ViewHeight*m). In addition, the initial value of the raster data for representing the view window is set as 0.

The original coordinate of received original spatial data is transformed into the view coordinate in the view window coordinate system according to the preset view control parameter, the original coordinate point of the original spatial data corresponds to the view coordinate point in the view window coordinate system, and each view coordinate point corresponds to the pixel of the view window represented by the raster data according to the view control parameter.

Step S12: analyzing or processing the view coordinate in the view window according to a processing method corresponding to a set processing type.

The set processing type includes any one, combination or all selected from a group consisting of selecting spatial data, simplifying, transmitting and detecting and avoiding a collision on element annotation. The corresponding processing method includes a method for selecting spatial data, a method for simplifying, a method for transmitting and a method for detecting and avoiding the collision on element annotation. The specific processing method to be selected is determined by the processing type to be performed during the practical process. Herein, the processing type is not limited to the above-mentioned types, and any processing type fall within the scope of protection of the present invention, as long as the processing type relates to the processing of the spatial data.

The processing type can be preset before the process is performed, and can also be set during the process. Specifically, the view coordinate in the view window is analyzed or processed according to a processing method corresponding to a set processing type, which can be implemented by one or a combination of methods selected from a group consisting of analyzing or processing the view coordinate directly, analyzing or processing the pixel of the view window corresponding to the view coordinate point, analyzing or processing the pixel to be operated when the spatial entity is displayed in the view window, and the like; or rasterizing a pixel to be operated when the original spatial data is displayed in the view window by the view coordinate, by means of assigning the value to the pixel, according to a processing method corresponding to a set processing type, i.e., rasterizing the original spatial data in the view window, then analyzing or processing the pixel in the view window; and analyzing or processing the view coordinate according to the result of analyzing or processing the pixel. For example, by analyzing whether a certain coordinate point in the view window corresponds to multiple original spatial data, it is determined whether it is necessary to select one data from multiple original spatial data as the data corresponding to this point, and to omit the other data. It can be only analyzing which one data is to be selected and obtaining the analyzing result, but not performing the selecting operation; alternatively, it can be analyzing and then selecting data according to the analyzing result, and the specific processing manner is determined by the practical situation. The object of rasterizing in this embodiment is to analyze or process the original spatial data by analyzing or processing the value of the pixel in the raster image that is obtained by transforming the original spatial data, therefore the pixel is generally assigned with the value which indicates the identifier representing the original spatial data or indicates the existence of a coordinate point, or the like.

Step S13: analyzing or processing the original coordinate corresponding to the view coordinate according to the result of analyzing or processing the view coordinate, so as to analyze and process the original spatial data.

Because the view coordinate point is obtained by transforming the original coordinate point of the original spatial data and the data transformed from the original coordinate of the original spatial data into the view coordinate is referred to the view data, the view data has a corresponding relation ship with the original spatial data, the original coordinate point corresponds to the view coordinate point. The original spatial data is processed using this relation ship according to the result of processing the view coordinate, the results of displaying the processed original spatial data is the same as that of displaying the processed view data in the view window (such as the computer screen window). The result of analyzing or processing the data corresponding to a certain view coordinate in the view data can be obtained by the above steps, and according to the result of analyzing or processing, the original spatial data corresponding to this view data is processed correspondingly.

According to the method for processing spatial data disclosed by the embodiment of the present invention, the original coordinate of the original spatial data is transformed into the view coordinate in the view window according to the preset view control parameter, the view coordinate is analyzed or processed in the view window, and the original spatial data is processed according to the result of analyzing or processing. It is ensured that the spatial data is analyzed and processed based on the view window during processing the original spatial data, so that the analyzing and processing result only relates to the resolution corresponding to the view window, rather than the size of the original spatial data, so as to solve the problems in the prior, for example, the massive spatial data after analyzing and processing. It is ensured that the processed data can indicate the spatial relation between the spatial data correctly, because the step of analyzing and processing is based on the view window.

Figure 2:
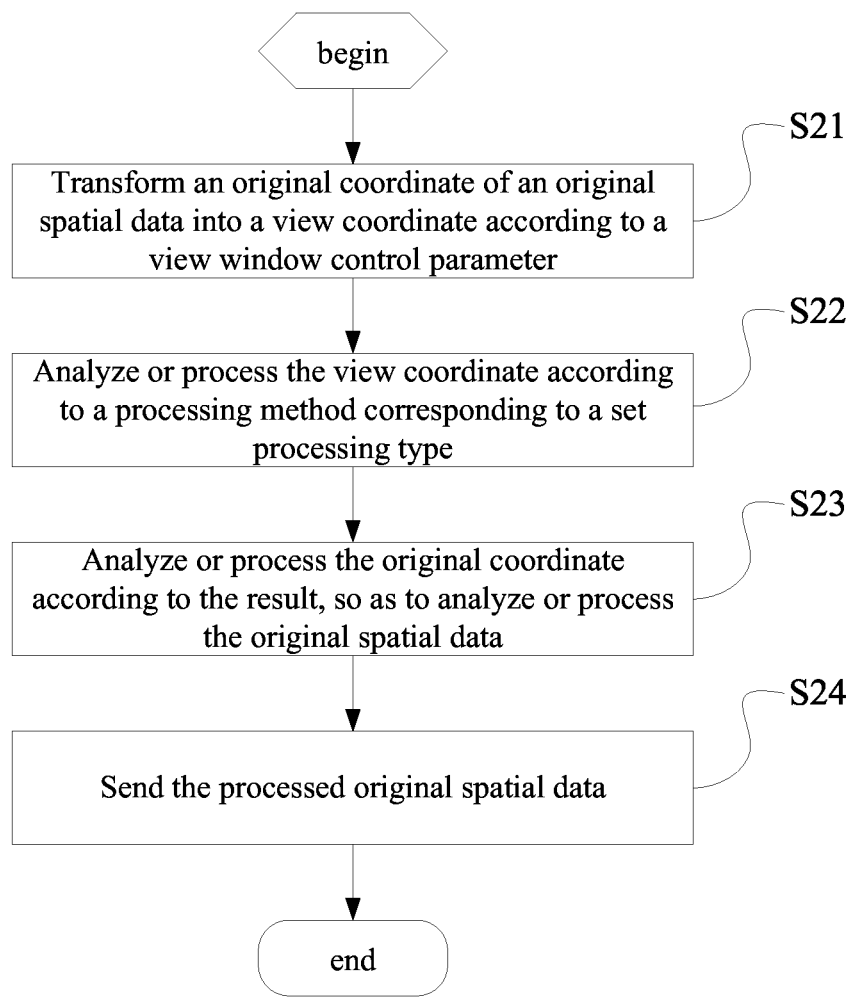
FIG. 2 is a flow chart of another method for processing spatial data disclosed by an embodiment of the present invention.

The flow chart of another method for processing spatial data disclosed by the present invention is shown in FIG. 2, which includes the following steps.

Step S21: transforming an original coordinate of received original spatial data into a view coordinate in a view window according to a preset view control parameter; and representing the view window using a data structure according to the view control parameter;

Step S22: analyzing or processing the view coordinate in the view window according to a processing method corresponding to a set processing type;

Step S23: analyzing or processing the original coordinate corresponding to the view coordinate according to the result of analyzing or processing of the view data, so as to analyze and process the original spatial data; and Step S24: sending the processed original spatial data.

As compared with the flow chart shown in FIG. 1, the method for processing spatial data disclosed by this embodiment further includes a step of sending the processed original spatial data. It can be seen from this that the data transmitted in this embodiment is the processed original spatial data, rather than the massive spatial data. Thus the size of the data in the transmission is decreased significantly, the problems caused by transmitting the massive spatial data, such as the huge transmission data and the difficulty in displaying, are solved, and the transmission efficiency and the displaying efficiency are improved.

This embodiment is not limited to sending the processed original spatial data, but the processed original spatial data can also be displayed and stored, or the like, for facilitating the subsequent process.

Figure 3:
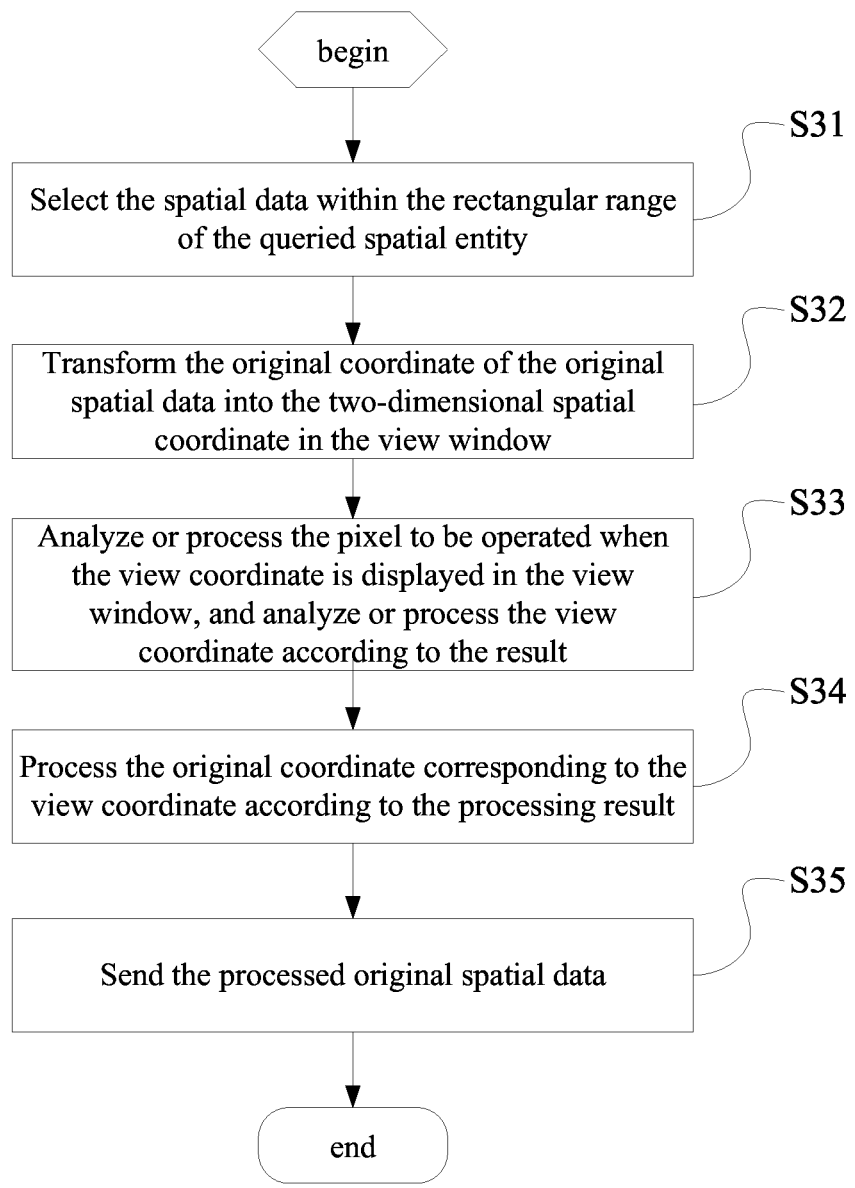
FIG. 3 is a flow chart of another method for processing spatial data disclosed by an embodiment of the present invention.

The flow chart of another method for processing spatial data disclosed by an embodiment of the present invention is shown in FIG. 3, which focuses on the description of processing the spatial data when the view mode of the actual view window is in a two-dimensional mode. For the two-dimensional view mode, besides the view mode and the parameter of the bounding rectangle of the view window, the view control parameter further includes a rectangular range for the queried spatial entity and an amplification ratio of the spatial entity in the view. The method includes the following steps.

Step S31: selecting spatial data within the rectangular range of the queried spatial entity.

The rectangular range of the queried spatial entity refers to a range in which the spatial entities is displayed on the view window, i.e., the bounding rectangle of the spatial entity that can be displayed in the view window, and its specific range is set by the practical displaying situation.

Step S32: transforming the original coordinate of the original spatial data into a two-dimensional spatial coordinate in the view window according to the parameter of the bounding rectangle of the view window, the rectangular range of the queried spatial entity and the amplification ratio of the spatial entity in the view.

The amplification ratio of the spatial entity in the view indicates the size of the spatial entity displayed in the view window. For example, if the spatial entity within the rectangular range of the given spatial entity to be queried is full-screen displayed in the view window, the method of calculating the amplification ratio of the spatial entity is that the value obtained by dividing the width of the bounding rectangle of the view window by the width of the rectangle of the queried spatial entity is compared with the value obtained by dividing the height of the bounding rectangle of the view window by the height of the rectangle of the queried spatial entity, the smaller one of them is selected as the amplification ratio of the spatial entity.

The process of transforming the original coordinate into the view coordinate in the view window represented using the data structure according to the view control parameter is implemented as follow. Assumed that the parameter of the bounding rectangle of the view window is ViewRect (0, 0, the width ViewWidth of the bounding rectangle, the height ViewHeight of the bounding rectangle), the amplification ratio of the spatial entity in the view is ViewRadio, the rectangular range of the queried spatial entity is (X-axis minimum gxmin, Y-axis minimum gymin, X-axis maximum gxmax, Y-axis maximum gymax), and the coordinate point of the original spatial data is p(x, y), then the coordinate point in the view window coordinate system that is displayed in simulation is p'(x', y'), and it can be calculated in the following way:

$$x'=(x-(gxmin+gxmax)/2)*ViewRadio+ViewWidth/2;$$

$$y'=ViewHeight/2-(y-(gymin+gymax)/2)*ViewRadio.$$

Similarly, the coordinate point in the known view window coordinate system p'(x', y') can also be obtained, and the coordinate point in the original coordinate system p(x, y) can be calculated in the following way:

$$x=(gxmin+gxmax)/2+(x'-ViewWidth/2)/ViewRadio;$$

$$y=(gymin+gymax)/2+(ViewHeight/2-y')/ViewRadio.$$

Step S33: analyzing or processing in the view window a pixel to be operated when the view coordinate is displayed in the view window, according to a processing method corresponding to a set processing type; and analyzing or processing the view coordinate according to the result of analyzing or processing.

The processing type in this embodiment is any one or a combination of the processing types in the embodiment described above.

In this embodiment, corresponding analyzing or processing is performed on the pixel to be operated when the view coordinate is displayed in the view window based on different processing types. The step of analyzing or processing specifically includes: reading the value of the pixel to be operated, judging the pixel value and assigning a value to the pixel to be operated. The above operation can be performed on individual pixel or on the combination of multiple pixels, and the specific processing manner can be set flexibly based on the actual requirement. The specific operation on the pixel includes assigning a value to the pixel, i.e., rasterizing the spatial data, reading the pixel value and judging the pixel value.

If the pixel is indicated by multiple-bit data, the step of assigning a value to the pixel can be implemented by assigning a value to one pixel as a whole or assigning a value to any one or more bits in the multiple-bit data representing the pixel; the step of reading the pixel value can be implemented by reading one pixel value as a whole or reading the value of a certain or several bits in the pixel; and similarly, the step of judging the pixel value can be implemented by judging the meaning represented by the one pixel value as a whole or judging the meaning represented by the value of a certain or several bits.

For example, one pixel in the view window is represented by the 4-bit data, in which the first bit represents whether there is a point element to be rasterized on this pixel, the second bit represents whether there is a line element to be rasterized on this pixel, the third bit represents whether there is a region element to be rasterized on this pixel, and the fourth bit is used for simplifying the spatial vector data. Firstly, several constants are defined:

| | |
|---|---|
| #define point | 0x0001 |
| #define line | 0x0002 |
| #define region | 0x0004 |
| #define simple | 0x0008 |

For example, the operations on the pixel corresponding to the line spatial entity are as follows.

the assignment operation of the pixel: the pixel is assigned by the OR operation of the defined constant line and the pixel value, so as to realize the rasterizing of the original spatial data. For example, a line rasterizing operation is performed on the P(x, y) pixel, P(x, y)=P(x, y)|line; rasterizing operation on the original spatial data is eliminated by the AND operation of the pixel value and the result of reversing the defined constant line, for example, the line rasterizing operation on the P(x, y) pixel is eliminated, P(x, y)=P(x, y)&~line;

reading the pixel value: the value of the raster data of P(x, y) is the value of the P(x, y) pixel; and judging the pixel value: for example, the step of judging whether the rasterizing operation is performed on the pixel by the original spatial data, which is operated by the AND operation of the defined constant line and the value of the pixel. For example, a step of judging whether the rasterizing operation is performed on the P(x, y) pixel includes: judging whether the value of P(x, y)&line is larger than 0, it is determined that the P(x, y) pixel is rasterized by the line spatial entity if the value of P(x, y)&line is larger than 0, and it is determined that the P(x, y) pixel is not rasterized by the line spatial entity if the value of P(x, y)&line is 0.

The pixel operation corresponding to other spatial entity can also be performed in the above way.

Step S34: processing the original coordinate corresponding to the view coordinate according to the result of analyzing or processing the view coordinate, so as to realize the step of analyzing and processing the original spatial data.

Step S35: sending the processed original spatial data.

In this embodiment, when the coordinate transformation is performed on the spatial data, the coordinate transformation is performed according to the rectangular range of the queried spatial entity and the amplification ratio of the spatial entity in the view, the coordinate transformation and corresponding processes is performed only on the spatial data within the rectangular range of the queried spatial entity according to the amplification ratio of the spatial entity in the view, but the data outside the rectangular range of the queried spatial entity is not processed, so that it is ensured that the spatial data is displayed in the actual view window efficiently, and meanwhile, the volume of the data that is processed and transmitted during the data processing is reduced significantly, and the processing and transmission efficiency of the data is improved.

This embodiment is not limited to the two-dimensional view mode, in which besides the view mode and parameter of the bounding rectangle of the view window, the view control parameter further includes the rectangular range of the queried spatial entity and the amplification ratio of the spatial entity in the view. In addition, the rectangular range of the queried spatial entity can be substituted by the center coordinate point of the spatial entity in the view window, as long as the original coordinate of the original spatial data can be transformed into the view coordinate in the view window.

In this embodiment, the data structure of the raster data representing the view window can be selected as the data array, and the pixel array of the raster data corresponding to the view window is represented by the data array, and each element in the data array represents one pixel in the pixel array. The data structure can also be implemented as chain list, tree, graph or the like. The specific implementation manner can be determined by the practical processing situation.

Figure 4:
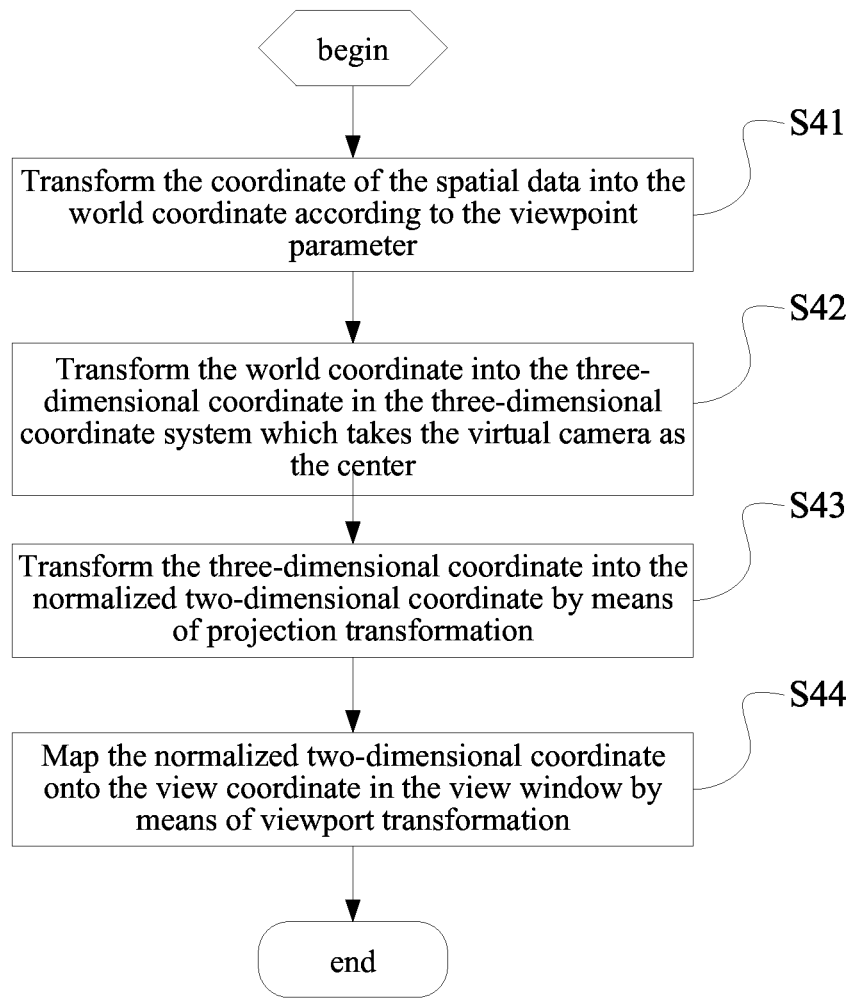
FIG. 4 is a flow chart of another method for processing spatial data disclosed by an embodiment of the present invention.

The flow chart of another method for processing spatial data disclosed by an embodiment of the present invention is shown in FIG. 4, which focuses on the process of processing the spatial data when the view mode of the actual view window is in a three-dimensional mode. In the three-dimensional view mode, besides the view mode and the parameter of the bounding rectangle of the view window, the view control parameter further includes a viewpoint parameter and a projection parameter, the viewpoint parameter includes a position $O(x_0, y_0, z_0)$ of the viewpoint in the preset world coordinate system, in which $x_0$, $y_0$, and $z_0$ represent three components of the viewpoint in the world coordinate system; a position $A(x_a, y_a, z_a)$ of an object viewed from the viewpoint; and a upward vector $up(x_{up}, y_{up}, z_{up})$ of a virtual camera. The projection parameter includes an orthogonal projection and a perspective projection; or a view matrix and a projection matrix obtained according to the above parameters, and the coordinate transformation is performed using the view matrix and the projection matrix. The process of obtaining a view coordinate in the view window according to the transformation of the view control parameter includes the follow steps:

Step S41: transforming the coordinate of the spatial data into the world coordinate according to the viewpoint parameter;

Step S42: transforming the world coordinate into a three-dimensional coordinate in a three-dimensional coordinate system which takes a virtual camera as a center, by means of a viewpoint transformation;

Step S43: transforming the three-dimensional coordinate in the three-dimensional coordinate system into a normalized two-dimensional coordinate by means of a projection transformation; and Step S44: mapping the normalized two-dimensional coordinate onto a view coordinate in the view window by means of a viewport transformation.

In the three-dimensional view mode, the size of a view frustum is determined by the bounding rectangle of the view window, the shape of the view frustum is determined by the projection parameter. The view frustum is a parallelepiped and there is a right angle between the sidewall and the bottom surface of the parallelepiped if the projection parameter is the orthogonal projection, and the view frustum is a frustum of a cone (a frustum) if the projection parameter is the perspective projection.

After the spatial entity is transformed from the world coordinate into the view coordinate, the spatial entity inside the view frustum will be display when being projected to fall within the view; the spatial entity outside the view frustum will be clipped. In the displaying operation based on the depth, the spatial entity ahead the front clipping surface and behind the rear clipping surface are clipped by the view frustum. In a certain condition, it is necessary to set parameters, such as the visual angle of the view frustum, the distance from the close clipping surface to the viewpoint and the distance from the distant clipping surface to the viewpoint.

According to the method disclosed by this embodiment, the data outside the view frustum can also be clipped using the view frustum, so as to reduce the size of the data that is processed and transmitted during the data processing significantly and improve the processing and transmission efficiency of the data.

Figure 5:
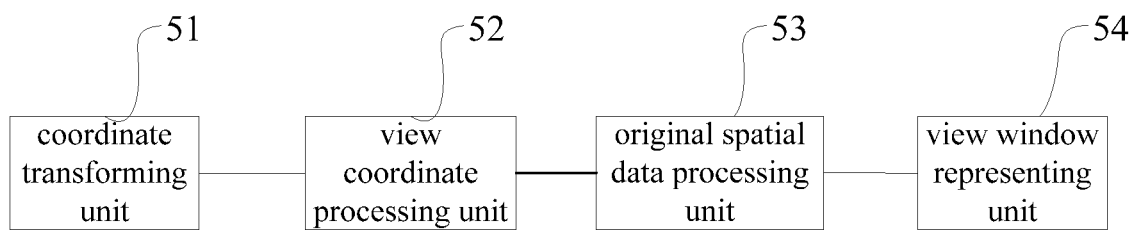
FIG. 5 is a schematic structural diagram of a device for processing spatial data disclosed by an embodiment of the present invention.

In addition, the present invention discloses a device for processing spatial data. The structure of the device is shown in FIG. 5, and the device includes a coordinate transforming unit 51, a view coordinate processing unit 52 and an original spatial data processing unit 53.

The coordinate transforming unit 51 is adapted for transforming an original coordinate of a received original spatial data into a view coordinate in a view window according to a preset view control parameter; the view coordinate processing unit 52 is adapted for analyzing or processing the view coordinate in the view window according to a processing method corresponding to a set processing type; and the original spatial data processing unit 53 is adapted for analyzing or processing the original coordinate corresponding to the view coordinate, according to the result of analyzing or processing the view coordinate, so as to realize the analyzing and processing of the original spatial data.

The system further includes a view window representing unit 54 adapted for representing the view window using a data structure according to the view control parameter.

Figure 6:
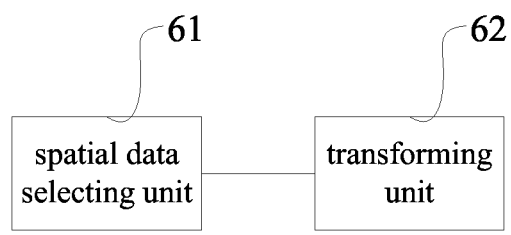
FIG. 6 is a schematic structural diagram of a coordinate transforming unit disclosed by an embodiment of the present invention.

The structure of the coordinate transforming unit 51 is shown in FIG. 6. The coordinate transforming unit 51 includes a spatial data selecting unit 61 for selecting spatial data within the rectangular range of the queried spatial entity; and a transforming unit 62 for transforming the spatial data coordinate into the two-dimensional spatial coordinate in the actual view window according to the parameter of the bounding rectangle of the view window, the rectangular range of the queried spatial entity and the amplification ratio of the spatial entity in the view. The coordinate transforming unit 51 is applied for the coordinate transforming in which the mode of the actual view window is the two-dimensional mode.

Figure 7:
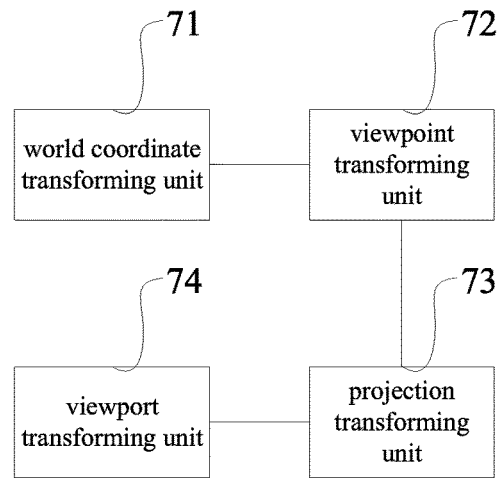
FIG. 7 is a schematic structural diagram of another coordinate transforming unit disclosed by an embodiment of the present invention.

The structure of another coordinate transforming unit 51 disclosed by this embodiment is shown in FIG. 7. This coordinate transforming unit is applied for the coordinate transforming in which the mode of the actual view window is the three-dimensional mode. This coordinate transforming unit 51 includes a world coordinate transforming unit 71 for transforming the coordinate of the spatial data into the preset world coordinate according to a viewpoint parameter; a viewpoint transforming unit 72 for transforming the world coordinate into a three-dimensional coordinate in a three-dimensional coordinate system which takes a virtual camera as a center, by means of viewpoint transformation; a projection transforming unit 73 for transforming the three-dimensional coordinate into a normalized two-dimensional coordinate by means of projection transformation; and a viewport transforming unit 74 for mapping the normalized two-dimensional coordinate onto a view coordinate in the view window by means of viewport transformation.

In an actual device, the two types of coordinate transforming units in FIGS. 6 and 7 can be arranged respectively, and can also be integrated into one unit, which can be selected to perform the corresponding operation according to different view modes.

Figure 8:
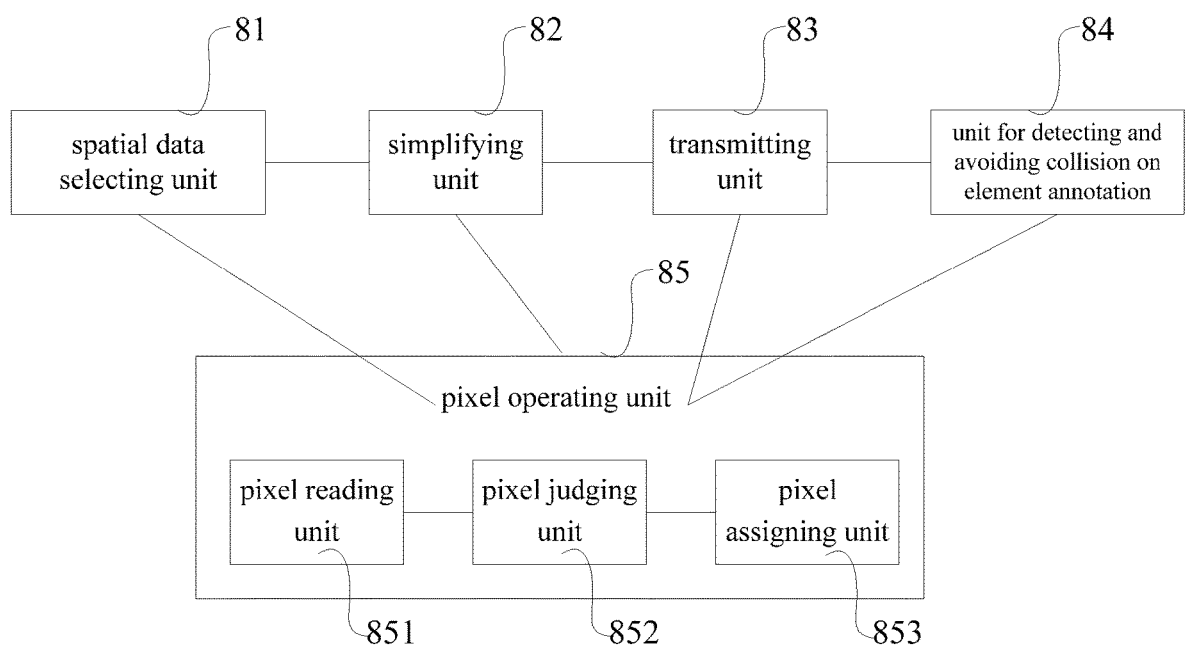
FIG. 8 is a schematic structural diagram of a view coordinate processing unit disclosed by an embodiment of the present invention.

The structure of the view coordinate processing unit 53 is shown in FIG. 8, and includes a spatial data selecting unit 81, a simplifying unit 82, a transmitting unit 83 and a unit 84 of detecting and avoiding a collision on element annotation.

The structure of the original spatial data processing unit 53 is the same as that in FIG. 8, and all the processing units within the view coordinate processing unit can be included in the original spatial data processing unit, for processing the original spatial data.

The view coordinate processing unit 53 further includes a pixel operating unit 85 for analyzing or processing a pixel to be operated when an original coordinate point is displayed in the view window, according to a processing method corresponding to a set processing type. The pixel operating unit 85 includes a pixel reading unit 851 for reading the value of the data representing the pixel; a pixel judging unit 852 for judging whether the value of the pixel conforms to a preset condition; and a pixel assigning unit 853 for assigning a value to the data representing the pixel. The pixel operating unit 85 cooperates with the spatial data selecting unit 81, the simplifying unit 82, the transmitting unit 83 and the unit 84 of detecting and avoiding a collision on element annotation, so that the step of analyzing or processing the view coordinate is realized by operating the pixel value according to the processing type of individual units.

An actual device can also includes other types of processing units, and the specific processing type can be set according to the practical situation. This device can also have all types of units provided in it, and different unit will be selected to perform the corresponding process according to the practical situation.

The working processes of individual units in the device for processing data disclosed by this embodiment are as follows:

The coordinate transforming unit transforms, according to the preset view control parameter, the original coordinate of the original spatial data into the view coordinate in the view window which is represented by the view window representing unit using the data structure according to the view control parameter, and the specific transforming process depends on the view mode. The view coordinate processing unit analyzes or processes the view coordinate in the view window according to a processing method corresponding to a set processing type, the specific analyzing and processing type includes selecting spatial data, simplifying, transmitting and detecting and avoiding a collision on element annotation, and the specific analyzing process includes: analyzing, by the pixel operating unit, the pixel to be operated when the view coordinate is displayed in the view window; analyzing or processing, by the original spatial data processing unit, the original coordinate corresponding to the view coordinate according to the result of the analyzing or processing of the view coordinate, after the analyzing and processing, so as to realize the analyzing and processing of the original spatial data.

The processes of operating the device for processing data disclosed by this embodiment correspond to the flows of the method embodiment disclosed by the above embodiment of the present invention, which is a preferred device embodiment. The specific processes of the device refer to the above method embodiment, which will not be described in detail here.

The device for processing data disclosed by the present invention can be provided in a computer, and can also be provided in a mobile phone or other devices in which the present invention can be applied, or can be provided in other intelligent device. The device can be provided at the server, in which case the spatial data is processed before the data request by the client is sent; the device can also be provided at the client, in which case the data is processed before being sent to the actual view window; or the device can be provided at the server and the client both, in which case either or both of the server and the client is selected for performing the process according to the practical situation.

In the present specification, the embodiments are described in progression, each embodiment mainly focuses on the difference aspect from other embodiments, and reference can be made to these similar parts among the embodiments. For the device disclosed by the embodiment, it corresponds to the method disclosed by the embodiment, and thus the description of the device is relatively simple, and the reference can be made to the method description for the related portion.

Those skilled in the art can further understand that the individual exemplary units and arithmetic steps that are described in conjunction with the embodiment disclosed herein are able to be implemented in the electronic hardware, the computer software or a combination thereof. For describing the interchangeability between the hardware and the software clearly, the components and the steps of individual example have been described according to the function generally in the above description. Whether these functions are implemented in hardware or software is determined by the technical solution-specific application and the design constraint condition. For each specific application, the described function can be implemented by those skilled in the art using different method, but this application should not be considered as beyond the scope of the present invention.

The steps of the method or the algorithm that are described in conjunction with the embodiment disclosed herein can be implemented in the hardware, the software module performed by the processor or the combination thereof. The software module can be built in the Random Access Memory (RAM), the memory, the Read-Only Memory (ROM), the electrically programmable ROM, the electrically erasable programmable ROM, the register, the hardware, the movable disc, the CD-ROM, or any other forms of storage medium that is well-known in the technical field.

The above descriptions of the disclosed embodiments enable those skilled in the art to implement or use the present disclosure. Various modifications made to those embodiments will be obvious to those skilled in the art, and the ordinal principles defined in the present disclosure can be implemented in other embodiments without departing from the spirit or the scope of the present disclosure. Therefore, the present invention should not be limited to those embodiments disclosed herein, but should be in coincidence with the widest scope in accordance with the principles and the novel characteristics disclosed by the present invention.

What is claimed is:

1. A method for processing spatial data, wherein the method comprises:
   transforming an original coordinate of a received original spatial data into a view coordinate in a view window according to a preset view control parameter, wherein the view window is determined by the preset view control parameter, the preset view control parameter comprises a bounding rectangle of the view window, and the bounding rectangle is determined by a size of an actual view window;
   analyzing or processing the view coordinate in the view window according to a processing method corresponding to a set processing type, wherein the set processing type comprises selection of spatial data, and the selected data are effective spatial data for implementing view display in the actual view window, wherein selection of spatial data comprises selection according to a pixel value in the view window, wherein a pixel in the view window is represented by a multiple-bit data, in which a first bit represents whether there is a point element to be rasterized on this pixel, a second bit represents whether there is a line element to be rasterized on this pixel, a third bit represents whether there is a region element to be rasterized on this pixel, and a fourth bit is used for simplifying the spatial data, and then the selection of the spatial data is made according to a judging on the pixel value;
   analyzing or processing the original spatial data according to the result of analyzing or processing the view coordinate;
   generating a spatial data set according to the result of analyzing or processing the original spatial data; and
   generating user resources comprising an electronic map from the spatial data set by an application of a computer graphic system, geographic information system, or virtual reality, wherein the generated user resources corresponds to the actual view window.

2. The method according to claim 1, wherein the view window is represented by a data structure according to the view control parameter.

3. The method according to claim 2, wherein the step of representing the view window by a data structure according to the view control parameter comprises:
   representing a pixel of the view window by a raster data structure according to the view control parameter; the pixel being a uniform grid unit into which the plane of the view window is divided, the pixel being a basic information storage unit in the raster data, and a coordinate position of the pixel being determined according to a corresponding line number and column number of the pixel in the view window.

4. The method according to claim 3, wherein the step of analyzing or processing the view coordinate in the view window according to a processing method corresponding to a set processing type comprises:
   analyzing or processing a pixel to be operated when the original spatial data is displayed in the view window, according to a processing method corresponding to a set processing type; and
   analyzing or processing the view coordinate according to the result of analyzing or processing the pixel.

5. The method according to claim 3, wherein the step of analyzing or processing the view coordinate in the view window according to a processing method corresponding to a set processing type comprises:
   analyzing or processing the pixel corresponding to a view coordinate point in the view window according to a processing method corresponding to a set processing type; and
   analyzing or processing the view coordinate point according to the result of analyzing or processing the pixel.

6. The method according to claim 3, wherein the step of analyzing or processing the view coordinate in the view window according to a processing method corresponding to a set processing type comprises:
   rasterizing a pixel to be operated when the original spatial data is displayed in the view window by the view coordinate, by means of assigning a value to the pixel, according to the processing method corresponding to the set processing type;
   analyzing or processing the pixel in the view window; and
   analyzing or processing the view coordinate according to the result of analyzing or processing the pixel.

7. The method according to claim 3, wherein the step of analyzing or processing the view coordinate in the view window according to a processing method corresponding to a set processing type comprises:
analyzing or processing the view coordinate directly according to a processing method corresponding to a set processing type.

8. The method according to claim 4, wherein the step of analyzing or processing a pixel to be operated when the original spatial data is displayed in the view window comprises:
reading the value of the pixel to be operated, which includes reading the value of the data for representing the pixel to be operated;
judging whether the value of the pixel to be operated conforms to a preset condition; and
assigning a value to the pixel to be operated, which includes assigning a value to the data for representing the pixel to be operated.

9. The method according to claim 1, further comprising: sending the original spatial data that has been analyzed or processed.

10. The method according to claim 1, wherein the view control parameter comprises a view mode and a parameter of a bounding rectangle of the view window; the view mode comprises a two-dimensional mode and a three-dimensional mode, and the parameter of the bounding rectangle of the view window comprises the width of the bounding rectangle of the view window and the height of the bounding rectangle of the view window.

11. The method according to claim 10, wherein in the case that the view mode is the two-dimensional mode, the view control parameter further comprises a center coordinate point of the spatial entity in the view window and an amplification ratio of the spatial entity in the view; the amplification ratio of the spatial entity in the view is used for representing the size in which the spatial entity is displayed in the view window.

12. The method according to claim 10, wherein in the case that the view mode is the two-dimensional mode, the view control parameter further comprises a rectangular range of a queried spatial entity and an amplification ratio of the spatial entity in the view.

13. The method according to claim 10, wherein in the case that the view mode is the three-dimensional mode, the view control parameter further comprises a viewpoint parameter and a projection parameter; the viewpoint parameter comprises a position of the viewpoint in the world coordinate system, a position of an object viewed from the viewpoint and an upward vector of a virtual camera; and the projection parameter comprises an orthogonal projection and a perspective projection.

14. The method according to claim 13, wherein the step of transforming an original coordinate of a received original spatial data into a view coordinate in a view window according to a preset view control parameter comprises:
transforming the original coordinate of the original spatial data into a world coordinate according to the viewpoint parameter;
transforming the world coordinate into a three-dimensional coordinate in a three-dimensional coordinate system which takes the virtual camera as a center, by means of a viewpoint transformation;
transforming the three-dimensional coordinate into a normalized two-dimensional coordinate by means of a projection transformation; and
mapping the normalized two-dimensional coordinate onto a view coordinate in the view window by means of a viewport transformation.

15. The method according to claim 1, wherein the set processing type comprises any one or a combination of processes selected from a group consisting of selecting spatial data, simplifying, progressive transmitting and detecting and avoiding a collision on element annotation.

16. A device for processing a spatial data, comprising a processor and a memory with instructions stored therein, the following are implemented when the processor performs the instructions:
transforming an original coordinate of a received original spatial data into a view coordinate in a view window according to a preset view control parameter, wherein the view window is determined by the preset view control parameter, the preset view control parameter comprises a bounding rectangle of the view window, and the bounding rectangle is determined by a size of an actual view window;
analyzing or processing the view coordinate in the view window according to a processing method corresponding to a set processing type, wherein the set processing type comprises selection of spatial data and the selected data are effective spatial data for implementing view display in the actual view window, wherein selection of spatial data comprises selection according to a pixel value in the view window, wherein a pixel in the view window is represented by a multiple-bit data, in which a first bit represents whether there is a point element to be rasterized on this pixel, a second bit represents whether there is a line element to be rasterized on this pixel, a third bit represents whether there is a region element to be rasterized on this pixel, and a fourth bit is used for simplifying the spatial data, and then the selection of the spatial data is made according to a judging on the pixel value, and analyzing or processing the original spatial data according to the result of analyzing or processing the view coordinate;
generating a spatial data set according to the result of analyzing or processing the original spatial data; and
generating user resources comprising an electronic map from the spatial data set by an application of a computer graphic system, geographic information system, or virtual reality, wherein the generated user resources corresponds to the actual view window.

17. The device according to claim 16, comprising further instructions stored in the memory, the following are implemented when the processor performs the further instructions:
representing the view window by a data structure according to the view control parameter.

18. The device according to claim 17, wherein the analyzing or processing the view coordinate in the view window according to a processing method corresponding to a set processing type further comprises analyzing or processing a pixel to be operated when an original coordinate point is displayed in the view window, according to a processing method corresponding to a set processing type.

19. The device according to claim 18, wherein the analyzing or processing a pixel to be operated when an original coordinate point is displayed in the view window, according to a processing method corresponding to a set processing type comprises:
reading the value of the data representing the pixel;
judging whether the pixel value conforms to a preset condition; and
assigning a value to the data representing the pixel.

* * * * *